US008839693B2

(12) United States Patent
Schiemann et al.

(10) Patent No.: US 8,839,693 B2
(45) Date of Patent: *Sep. 23, 2014

(54) CENTRIFUGAL PENDULUM ABSORBER

(71) Applicant: Chrysler Group LLC, Auburn Hills, MI (US)

(72) Inventors: Marvin G. Schiemann, Bloomfield Hills, MI (US); Michael Fingerman, West Bloomfield, MI (US); Tomasz K. Kietlinski, Grosse Pointe, MI (US); Bruce Geist, Sterling Heights, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/957,556

(22) Filed: Aug. 2, 2013

(65) Prior Publication Data
US 2014/0047945 A1 Feb. 20, 2014

Related U.S. Application Data

(63) Continuation of application No. 13/587,991, filed on Aug. 17, 2012, now Pat. No. 8,561,499.

(51) Int. Cl.
*F16F 15/123* (2006.01)
*F16F 15/14* (2006.01)
*F16F 15/30* (2006.01)

(52) U.S. Cl.
CPC ............... *F16F 15/30* (2013.01); *F16F 15/145* (2013.01); *F16F 15/12366* (2013.01)
USPC ......................................... 74/574.2; 74/572.2

(58) Field of Classification Search
USPC ................... 74/572.2, 573.12, 574.1–574.4; 188/378; 192/3.28–3.3, 30 V
See application file for complete search history.

(56) References Cited

U.S. PATENT DOCUMENTS

| 4,471,863 | A | 9/1984 | Lech |
| 6,450,065 | B1 * | 9/2002 | Eckel et al. ................... 74/574.4 |
| 7,343,832 | B2 * | 3/2008 | Jaeckel et al. .............. 74/573.12 |
| 8,561,499 | B1 * | 10/2013 | Schiemann et al. .......... 188/378 |
| 2006/0283678 | A1 * | 12/2006 | Murakami .................... 188/379 |
| 2010/0122605 | A1 * | 5/2010 | Maienschein et al. ....... 74/574.2 |
| 2011/0179782 | A1 * | 7/2011 | Huegel et al. .................. 60/338 |

FOREIGN PATENT DOCUMENTS

| DE | 102009021355 A1 | 12/2009 |
| DE | 102009042156 A1 | 5/2010 |
| DE | 102011013232 A | 9/2011 |
| DE | 102010029464 A1 | 12/2011 |

OTHER PUBLICATIONS

International Search Report and Written Opinion dated Nov. 11, 2013 for International Application No. PCT/US2013/051205, International Filing Date Jul. 19, 2013.

* cited by examiner

*Primary Examiner* — Thomas Diaz
(74) *Attorney, Agent, or Firm* — Ralph E Smith

(57) ABSTRACT

A pendulum absorber assembly for a torque converter including a first spring retainer, a second spring retainer, and a floating flange positioned between the first spring retainer and the second spring retainer. The pendulum absorber assembly also includes a drive plate affixed to the floating flange, a plurality of arcuate springs disposed between the second spring retainer and the drive plate, and a plurality of pendulum weights affixed to the second spring retainer, wherein at least one of the pendulum weights is made of tungsten alloy.

9 Claims, 3 Drawing Sheets

CENTRIFUGAL PENDULUM ABSORBER

CROSS-REFERENCE TO RELATED APPLICATION

This application is a continuation of U.S. patent application Ser. No. 13/587,991, filed Aug. 17, 2012.

FIELD

The present disclosure relates to a centrifugal pendulum absorber for a torque converter, and, more particularly, to a centrifugal pendulum absorber for a compact torque converter.

BACKGROUND

In automobiles featuring an automatic transmission, a torque converter is typically positioned between the vehicle's engine and transmission. The torque converter couples the engine to the transmission and causes the transmission to rotate at a rate corresponding to the rotation rate of the engine. The torque converter also allows the engine to continue spinning even when the vehicle and, correspondingly, the transmission come to a stop. A typical torque converter includes a pump, turbine and stator. The torque converter also includes a housing which encloses the parts of the torque converter and has an impeller. The housing is fastened to an engine flywheel. The turbine is typically connected to the transmission. Fluid enclosed by the housing is circulated by rotation of the impeller and causes the turbine and, thereby, transmission, to rotate. The stator redirects fluid within the torque converter and provides for torque amplification.

A typical torque converter in a modern automobile includes the capability to selectively "lock" the turbine to the impeller, thereby, causing the turbine and impeller to rotate at the same speed. Thus, the engine and transmission rotate at the same speed. Locking the turbine to the impeller improves the efficiency of the torque converter by eliminating pumping losses in the fluid. To ensure that the locking does not cause an uncomfortable jolt in the vehicle's driveline, a typical torque converter includes a damper and a centrifugal pendulum absorber. A typical centrifugal pendulum absorber absorbs engine vibrations at a wide range of engine speeds. The mass and corresponding rotational inertia of the centrifugal pendulum absorber is used to absorb driveline vibrations.

As modern automobiles become more feature packed, smaller, and/or lighter, it is ever more desirable to reduce the size of driveline components. Often, the space in which the transmission must fit is limited. In some modern automobiles, larger transmissions with an increasing number of gear ratios are used. To compensate for this, it is desirable to reduce the size of other transmission components such as the torque converter. However, as many torque converters are already designed to be as compact as possible, it is increasingly difficult to find a way to reduce their size while still maintaining sufficient durability, performance, and acceptable costs. Simply reducing the size of the pendulum absorber assembly negatively affects its performance by reducing its rotational inertia and, thereby, its ability to absorb vibrations. This results in increased driveline harshness and noise. In current torque converters, the pendulum absorber assembly takes up a fair amount of space. To date, no manufacturer has been able to create a solution to meaningfully and cost effectively reduce its size.

What is needed therefore, is a more compact torque converter with equal or better performance, durability, and cost than existing torque converters. What is also needed is a pendulum absorber assembly that is more compact but with the same or increased rotational inertia and that still provides equal or better performance, durability, and cost than existing torque converters.

SUMMARY

In one form, the present disclosure provides a pendulum absorber assembly for a torque converter. The assembly includes at least one pendulum weight made from tungsten alloy.

In another form, the present disclosure provides a pendulum absorber assembly including a first spring retainer having a plurality of first spring retainer cutouts, a floating flange having a plurality of floating flange cutouts, and a second spring retainer having a plurality of second spring retainer cutouts and a plurality of recesses. The second spring retainer is affixed to the first spring retainer and the floating flange is positioned between the first spring retainer and the second spring retainer. The pendulum absorber assembly further includes a drive plate affixed to the floating flange and having a plurality of fingers and a plurality of springs. The plurality of springs are disposed in and make contact with the walls of the first spring retainer cutouts, floating flange cutouts, and the second spring retainer cutouts. The pendulum absorber also includes a plurality of arcuate springs. The plurality of arcuate springs are disposed between the second spring retainer and the drive plate. The ends of each of the plurality of arcuate springs make contact with the walls of the recesses and the walls of the fingers. The pendulum absorber assembly also includes a plurality of pendulum weights affixed to the second spring retainer. The pendulum weights are made of tungsten alloy.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Before describing the disclosed embodiments of the technology in detail, it is to be understood that the technology is not limited in its application to the details of the particular arrangement shown herein since the technology is capable of other embodiments. Also, the terminology used herein is for the purpose of description and not of limitation.

Figure 1:
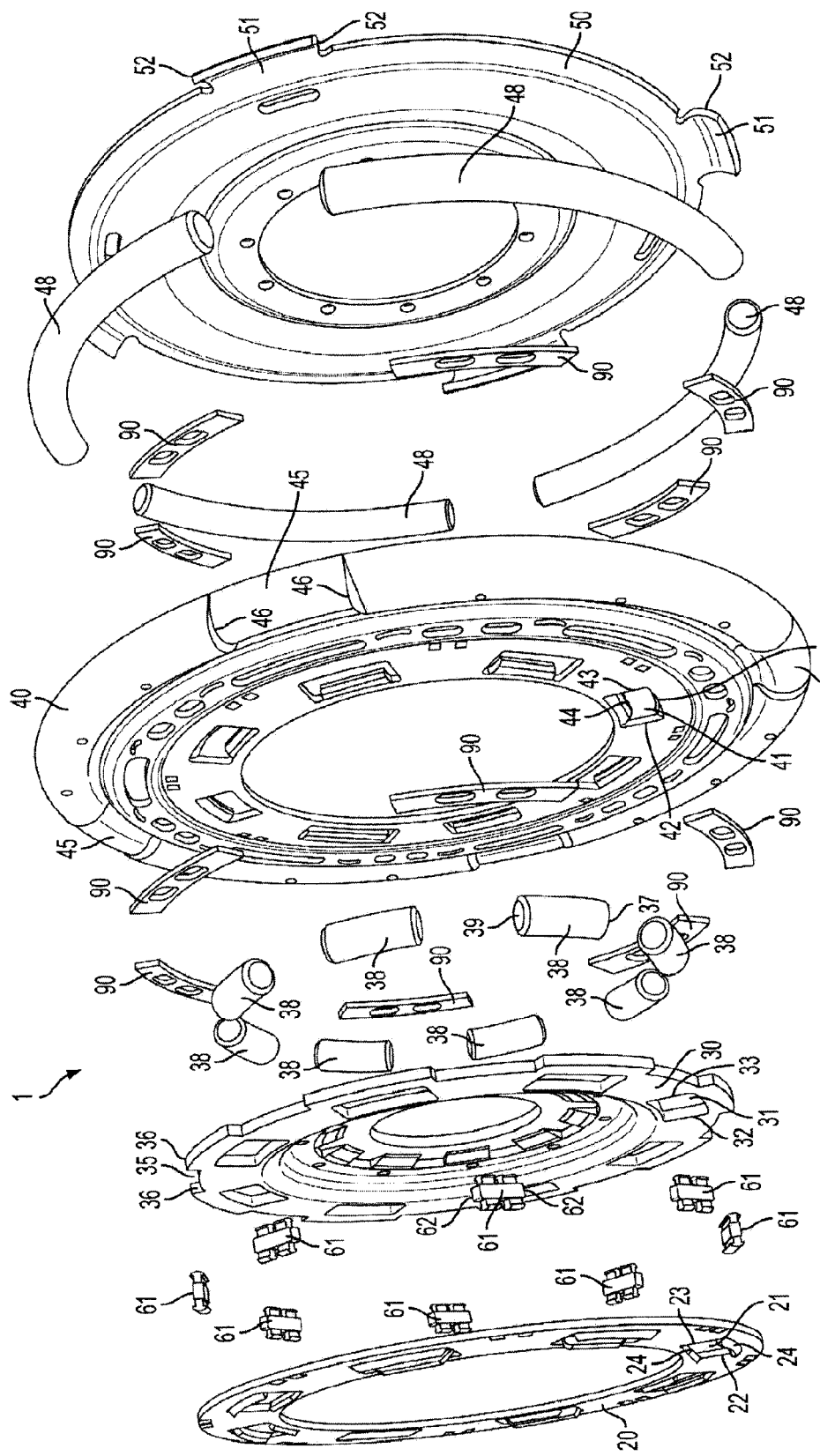
FIG. 1 is an exploded view diagram of an exemplary centrifugal pendulum absorber assembly having pendulum weights according to the principles of the present disclosure.

FIG. 1 illustrates an exploded view diagram of an exemplary centrifugal pendulum absorber assembly 1 ("pendulum absorber assembly 1") having pendulum weights 90 according to the principles of the present disclosure. The pendulum absorber assembly 1 includes a first spring retainer 20, a floating flange 30, and a second spring retainer 40. The first spring retainer 20 includes a plurality of cutouts 21 having cutout walls 22, 23; the floating flange 30 includes a plurality of cutouts 31 having cutout walls 32, 33; and the second spring retainer 40 includes a plurality of cutouts 41 having cutout walls 42, 43. The first spring retainer 20 is fixedly coupled to the second spring retainer 40 by a plurality of stops 61. The floating flange 30 is sandwiched between the first spring retainer 20 and second spring retainer 40 and is not directly affixed to either the first spring retainer 20 and second spring retainer 40. Rather, each of the plurality of stops 61 that connect the first spring retainer 20 and second spring retainer 40 rides in a gap 35 on the outer circumference of the floating flange 30. The arcuate length of each stop 61 is less than the arcuate length of each gap 35. Thus, the floating flange 30 is free to rotate with respect to the stops 61, first spring retainer 20 and second spring retainer 40. However, the degree of rotation of the floating flange 30 with respect to the stops 61, first spring retainer 20 and second spring retainer 40 is bounded by the difference between the arcuate length of each stop 61 and each gap 35. Rotation of the floating flange 30 with respect to the stops 61, first spring retainer 20 and second spring retainer 40 is constrained by contact between stop walls 62 and gap walls 36. Thus, the floating flange 30 is permitted to rotate several degrees with respect to stops 61, first spring retainer 20 and second spring retainer 40.

The pendulum absorber assembly 1 further includes a spring 38 circumferentially configured in each of the plurality of cutouts 21, cutouts 31 and cutouts 41. A single spring 38 circumferentially spans a single cutout 21, cutout 31 and cutout 41. Cutouts 21, cutouts 31 and cutouts 41 are approximately aligned with one another. The cutouts 21 on the first spring retainer 20 each contain a pair of cutout flanges 24 that prevent the associated spring 38 from moving in a direction away from the second spring retainer 40. Likewise, the cutouts 41 on the second spring retainer 40 each contain a pair of cutout flanges 44 that prevent the associated spring 38 from moving in a direction away from the first spring retainer 20. Thus, the springs 38 are retained between the first spring retainer 20 and second spring retainer 40 in cutout 21, cutout 31, and cutout 41.

A first end 37 of spring 38 is in contact with a first end of cutout walls 22, 32, 42 and a second end 39 of spring 38 is in contact with a second end of cutout walls 23, 33, 43. As discussed above, the floating flange 30 is permitted a predetermined amount of rotation with respect to the first spring retainer 20 and second spring retainer 40. The springs 38 provide resistance to this movement and serve to keep the floating flange 30 aligned with the first spring retainer 20 and second spring retainer 40. However, the spring force of the springs 38 may be overcome to permit relative rotation between first spring retainer 20 and second spring retainer 40, and floating flange 30.

The pendulum absorber assembly 1 also includes a drive plate 50 coupled to the floating flange 20. The drive plate 50 and the floating flange 30 are both coupled to the turbine shell (not shown) of the torque converter. The drive plate 50 and floating flange 30 assembly can rotate a predetermined amount with respect to the first spring retainer 20 and second spring retainer 40. The drive plate 50 includes a plurality of fingers 51 having finger walls 52. The second spring retainer 40 includes a plurality of recesses 45 having recess walls 46. The recess 45 are on the outer portion of the second spring retainer 40 that forms a concave circumferential region. The recess walls 46 are formed on the interior portion of the concave region and form the two radial edges of the recess 45. The recesses 45 are approximately at the same diameter as, aligned with and of approximately the same arcuate size as the fingers 51.

The pendulum absorber assembly 1 also includes a plurality of arcuate springs 48. In one embodiment, the pendulum absorber assembly includes an identical number of arcuate springs 48, recesses 45, and fingers 51. The arcuate springs 48 are positioned in the concave circumferential region of the second spring retainer 40 between the second spring retainer 40 and the drive plate 50. The ends of each arcuate spring 48 contact the finger walls 52 and the recess walls 46. Thus, the arcuate springs 48 provide resistance to relative movement between the second spring retainer 40 and the drive plate 50. The pendulum absorber assembly 1 also includes a plurality of pendulum weights 90 coupled to the second spring retainer 40. The pendulum weights 90 are discussed in greater detail below with reference to FIG. 3.

Figure 2:
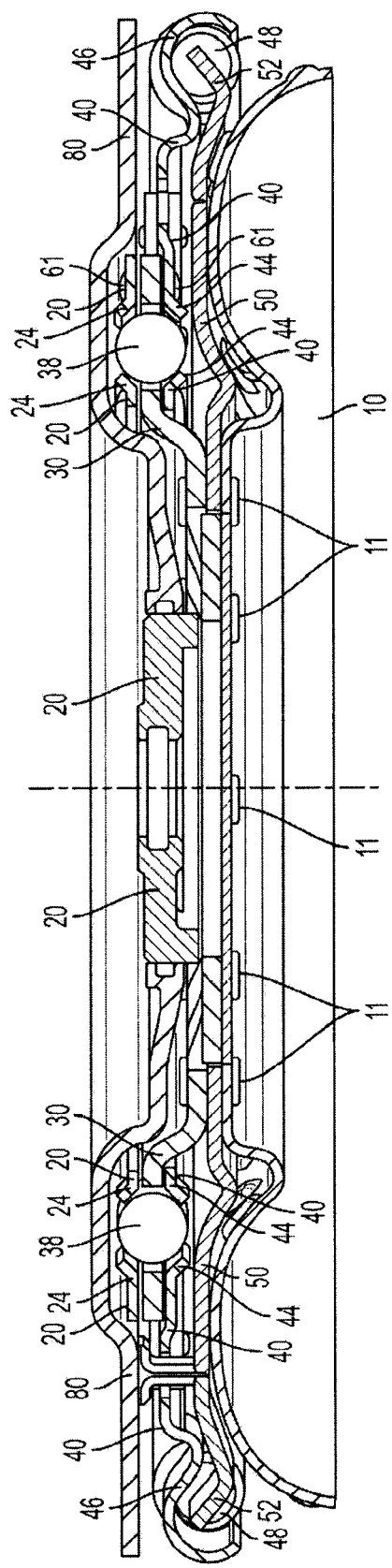
FIG. 2 is a cross-sectional diagram depicting the exemplary centrifugal pendulum absorber assembly having the pendulum weights of FIG. 1.

FIG. 2 is a cross-sectional diagram depicting the exemplary centrifugal pendulum absorber assembly 1 of FIG. 1. The drive plate 50 and floating flange 30 are coupled to the turbine shell 10 by a plurality of fasteners 11. The first spring retainer 20 is coupled to the second spring retainer 40 by the stops 61. A piston 80, a part of the lockup clutch (not shown) of the torque converter 1, is coupled to the drive plate 50, floating flange 30, and turbine shell 10 assembly. As can be seen, the arcuate springs 48 ride in the concave circumferential region of the second spring retainer 40 between the second spring retainer 40 and the drive plate 50. The arcuate springs 48 contact the finger walls 52 and recess walls 46. As can also be seen, the springs 38 ride in the slot 31 (see FIG. 1) of the floating flange 30 between the first spring retainer 20 and second spring retainer 40. The cutout flange 24 of the first spring retainer 20 and the cutout flange 44 of the second spring retainer 40 border the springs 38.

As can be seen, the arcuate springs 48 are positioned in the concave circumferential region of the second spring retainer 40 between the second spring retainer 40 and the drive plate 50. The ends of each arcuate spring 48 contact the finger walls 52 and the recess walls 46. Cutout flanges 24 and cutout flanges 44 keep the associated spring 38 firmly in place. A plurality of fasteners 11 keep the floating flange 30 fixedly attached to the drive plate 50.

Figure 3:
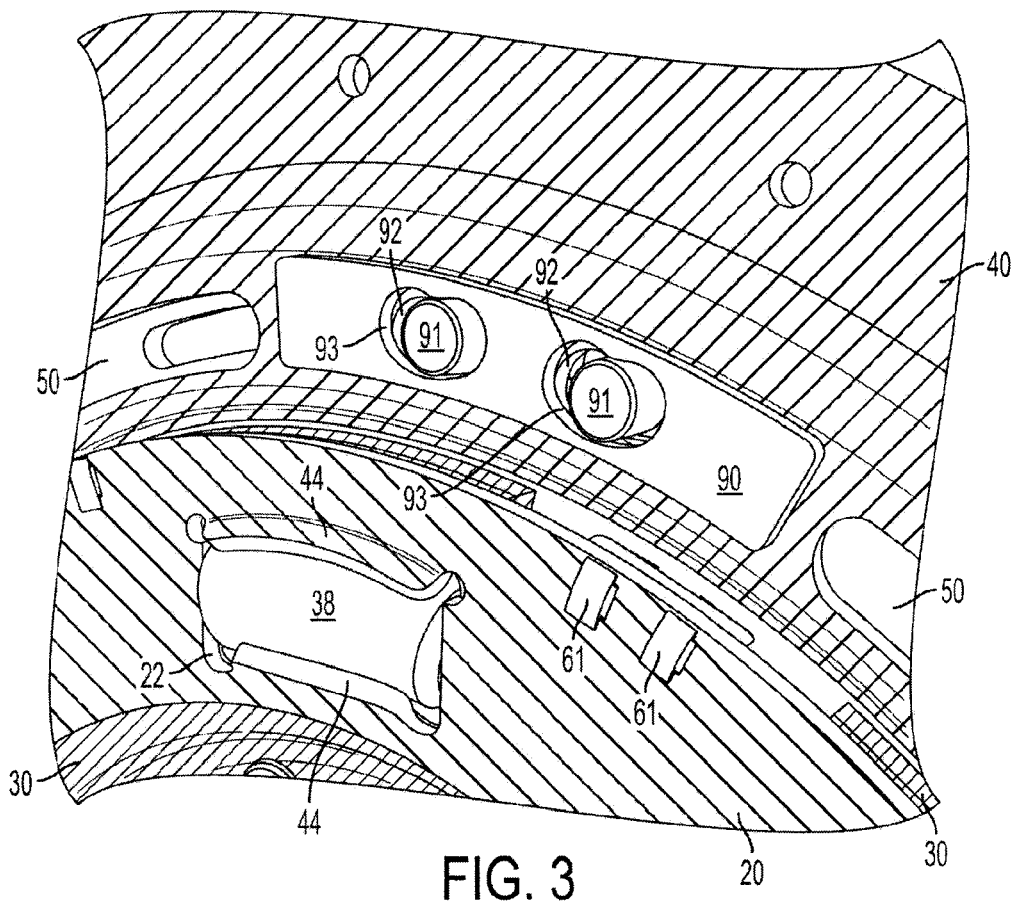
FIG. 3 is a diagram depicting another view of the exemplary centrifugal pendulum absorber assembly having the pendulum weights of FIG. 1.

FIG. 3 is a diagram depicting another view of the exemplary centrifugal pendulum absorber assembly 1 and pendulum weights 90 of FIG. 1. A plurality of pendulum weights 90 are affixed to the second spring retainer 40. Pendulum weights 90 are affixed to the left and right side opposite one another of the second spring retainer 40 of FIG. 1. The pendulum weight 90 is of an arcuate shape having, in one embodiment, a length of 53.5 mm. In another embodiment, the pendulum weight 90 is longer or shorter than 53.5 mm. In one embodiment, the pendulum weight 90 is approximately 10.5 mm wide in the radial direction. In one embodiment, the pendulum weight 90 is wider or narrower than 10.5 mm. In one embodiment, the pendulum weight 90 is 1.85 mm thick. In one embodiment, the pendulum weight 90 may be thicker or thinner than 1.85 mm.

The spring retainer includes a plurality of slots 92 through which a roller 91 is positioned. In one embodiment, each pendulum weight 90 includes two rollers 91 positioned through two slots 92. In other embodiments, more or less rollers 91 and slots 92 may be used. The slots 92 are larger than the rollers 91, thus, allowing slight movement of the rollers 91 relative to the slots 92. In one embodiment the slots 92 allow the rollers 91 2.5 mm of movement in each direction from a center position. Likewise, the slots 93 of the pendulum weight 90 through which the rollers 91 pass are larger than the rollers 91, thus allowing slight movement of the pendulum weight 90 relative to the rollers 91. In one embodiment the pendulum weight 90 moves relative to the rollers 91 13.5 mm in each direction from a center position. Thus, the pendulum weight 90 is capable of slight movement relative to the second spring retainer 40.

One of the pair of pendulum weights 90 is held in place by the rollers 91 between the floating flange 30 and the second spring retainer 40. The other of the pair of pendulum weights 90 is held in place between the second spring retainer 40 and the drive plate 50. The distance between the floating flange 30 and second spring retainer 40 and, likewise, between the second spring retainer 40 and the drive plate 50 is controlled in large part by the thickness of the pendulum weight 90. In all existing known pendulum absorber assemblies, the pendulum weights are manufactured from steel. In the invention of the present application, the pendulum weights 90 are manufactured of tungsten alloy. Tungsten alloy is approximately 2.5 times denser than steel. The use of highly dense tungsten alloy allows the thickness and overall size of the pendulum weights 90 to be greatly reduced without negatively impacting the performance of the pendulum absorber assembly 1. Specifically, the use of tungsten alloy in the pendulum weights 90 maintains the same rotational inertia in the pendulum absorber assembly 1 while reducing the overall size of the pendulum weights 90. This allows the floating flange 30 to be coupled more closely to the second spring retainer 40 and the second spring retainer 40 to be coupled more closely to the drive plate 50, thus, reducing the overall size of the pendulum absorber assembly 1.

It should be understood that the above described construction of the pendulum absorber assembly is for reference purposes only. Any type of pendulum absorber assembly having pendulum weights may be used. Moreover, any configuration or shape of pendulum weights may be used. An important aspect of the invention is that the pendulum weights are made from tungsten alloy.

Thus, a compact pendulum absorber assembly is provided. More specifically, a pendulum absorber assembly having tungsten alloy pendulum weights of a reduced size is disclosed. The pendulum weights and, thereby, the torque converter, provide for equal or better performance and durability than existing torque converters while being more compact in size.

What is claimed is:

1. A pendulum absorber assembly comprising:
   a first spring retainer having a plurality of first spring retainer cutouts;
   a floating flange having a plurality of floating flange cutouts;
   a second spring retainer having a plurality of second spring retainer cutouts and a plurality of recesses, wherein the second spring retainer is affixed to the first spring retainer and the floating flange is positioned between the first spring retainer and the second spring retainer;
   a drive plate affixed to the floating flange and having a plurality of fingers;
   a plurality of springs disposed in and making contact with the walls of the first spring retainer cutouts, floating flange cutouts, and the second spring retainer cutouts;
   a plurality of arcuate springs disposed between the second spring retainer and the drive plate, wherein the ends of each of the plurality of arcuate springs make contact with the walls of the recesses and the walls of the fingers; and
   a plurality of pendulum weights affixed to the second spring retainer, wherein at least one of the pendulum weights is made of tungsten alloy.

2. The pendulum absorber assembly of claim 1, wherein the at least one pendulum weight made of tungsten alloy is 1.85 mm thick.

3. The pendulum absorber assembly of claim 1 wherein the pendulum weights have an arcuate shape.

4. The pendulum absorber assembly of claim 1, wherein each of the pendulum weights has a pair of slots.

5. The pendulum absorber assembly of claim 1, wherein a first of the plurality of pendulum weights is positioned on a first side of the second spring retainer and a second of the plurality of pendulum weights is affixed on a second, opposing side of the second spring retainer opposite the first pendulum weight.

6. The pendulum absorber assembly of claim 5, wherein:
   the first pendulum weight further includes a first pair of slots;
   the second pendulum weight further includes a second pair of slots;
   the second spring retainer includes a pair of slots corresponding to the first pair of slots of the first pendulum weight and the second pair of slots corresponding to the second pendulum weight; and
   a roller is positioned such that it extends through the first pair of slots of the first pendulum weight, the slots of the second spring retainer, and the second pair of slots of the second pendulum weight.

7. The pendulum absorber assembly of claim 6, wherein:
   the first pair of slots of the first pendulum weight permit relative movement between the roller and the first pendulum weight;
   the second pair of slots of the second pendulum weight permit relative movement between the roller and the second pendulum weight; and
   the pair of slots of the second spring retainer permit relative movement between the roller and the second spring retainer.

8. The pendulum absorber assembly of claim 6, wherein:
   the first pair of slots of the first pendulum weight permit relative movement between the roller and the first pendulum weight; and
   the second pair of slots of the second pendulum weight permit relative movement between the roller and the second pendulum weight.

9. The pendulum absorber assembly of claim 6, wherein the pair of slots of the second spring retainer permit relative movement between the roller and the second spring retainer.

* * * * *